United States Patent [19]
Zenker

[11] 3,971,443
[45] July 27, 1976

[54] DISCHARGE HEAD HAVING DUAL FUNCTION PLUG RETAINING MEMBER

[75] Inventor: Karol R. Zenker, Needham, Mass.

[73] Assignee: Factory Mutual Research Corporation, Norwood, Mass.

[22] Filed: June 11, 1975

[21] Appl. No.: 585,742

Related U.S. Application Data

[63] Continuation of Ser. No. 499,639, Aug. 22, 1974, abandoned, which is a continuation of Ser. No. 346,454, March 30, 1973, abandoned.

[52] U.S. Cl. .................................. 169/39; 169/42
[51] Int. Cl.² .......................................... A62C 37/12
[58] Field of Search .................... 169/19, 37–42, 169/20, 21

[56] References Cited
UNITED STATES PATENTS

| | | | |
|---|---|---|---|
| 302,991 | 8/1884 | Fowler | 169/40 |
| 1,028,940 | 6/1912 | Hunter | 169/39 |
| 3,314,482 | 4/1967 | Young | 169/38 |
| 3,561,537 | 2/1971 | Dix et al. | 169/38 |
| 3,633,676 | 1/1972 | Gloeckler | 169/40 |
| 3,653,444 | 4/1972 | Livingston | 169/5 |
| 3,684,025 | 8/1972 | Livingston | 169/42 |
| 3,714,989 | 2/1973 | Gloeckler | 169/39 |
| 3,828,855 | 8/1974 | Woodward et al. | 169/42 X |

Primary Examiner—Robert S. Ward, Jr.
Attorney, Agent, or Firm—Lane, Aitken, Dunner & Ziems

[57] ABSTRACT

A pressure responsive discharge head wherein an expellable plug is disposed in the outlet of a body member having an inlet adapted for connection to a source of extinguishant with the plug being connected relative to the body member by means of a pair of fulcrummed levers. A fusible link maintains the levers in the plug retaining position and is responsive to a predetermined temperature for releasing the levers. An additional member is provided which maintains the levers in a plug retaining position and which is adapted to release the levers in response to a predetermined fluid pressure in the body member, or in response to an additional predetermined temperature.

8 Claims, 5 Drawing Figures

DISCHARGE HEAD HAVING DUAL FUNCTION PLUG RETAINING MEMBER

CROSS-REFERENCE TO RELATED APPLICATIONS

This application is a continuation of application Ser. No. 499,639, filed Aug. 22, 1974, now abandoned, which, in turn, is a continuation of application Ser. No. 346,454, filed Mar. 30, 1973, now abandoned.

BACKGROUND OF THE INVENTION

In U.S. Pat. No. 3,653,444, assigned to the same assignee as the present application, a fixed fire extinguishing system is disclosed which incorporates a plurality of direct discharge heads spaced apart greater distances and having larger outlet orifices when compared to conventional sprinkler heads, to enable greater quantities of water, or other extinguishant, to be delivered from each head at lower flow rates. Preferably, the heads are in the form of wide angle spray nozzles which develop a downwardly directed spray having large size droplets as compared to the droplets produced by the conventional sprinkler heads. According to one of the main features of the system disclosed in this patent, the number of nozzles activated to discharge the extinguishant is limited in order to prevent nozzles located a relatively long distance from the fire to rob more closely located nozzles of valuable extinguishant and extinguishant pressure, and in order to prevent unnecessary water damage.

With this arrangement, the first nozzle actuated by the fire has a much better possibility of extinguishing the fire, because of its ability to retain a predetermined discharge density and the increased ability of the larger droplets to penetrate the fire plume of a high challenge fire. Of course, if the heat of the fire spreads, a limited number of additional nozzles are actuated to help the first nozzle fight the fire and to wet down areas surrounding the fire to provide exposure protection to inhibit the spread of the fire, with the number of additional nozzles that are allowed to be actuated being limited to a small predetermined number in accordance with the foregoing.

According to a preferred embodiment of the above-mentioned system, the above is achieved by establishing a pressure floor so that a minimum pressure must exist at each nozzle before it will open, with the system being designed so that this minimum pressure will not be reached until a predetermined number of nozzles have been opened. The hardware used to establish the pressure floor includes an expellable plug normally blocking the outlet of the nozzle and adapted to be expelled from the nozzle to permit extinguishant flow therethrough upon both the fusing of a conventional temperature responsive device and the presence of a fluid pressure in the nozzles of a magnitude exceeding a predetermined value. In establishing the latter value, a helical compression spring is utilized to latch the expellable plug in a closed position. The design is such that the extinguishant pressure in the nozzle acts upon the helical spring and has to be of a value to overcome the force of the spring before the expellable plug can be released.

In U.S. patent application Ser. No. 256,820, filed May 25, 1972 now abandoned, and assigned to the same assignee as the present invention, a discharge head is disclosed which incorporates the pressure floor feature discussed above and which adds an additional feature directed to a thermal override. In accordance with the latter disclosure, the thermal override is achieved by an additional temperature responsive member which is adapted to open the head in response to a predetermined elevated temperature regardless of the previous conditions that existed. In this manner, in the event the first temperature responsive member is actuated but the head is prevented from opening by virtue of an insufficient pressure occurring therein, the head will be opened by the thermal override to provide a failsafe operation. In order to incorporate the thermal override in the arrangement of the above application, the discharge plug is connected to its rod by means of a fusible sleeve which, when fused in response to the elevated temperature, permits the plug to release therefrom despite the fact that the pressure existing in the head is insufficient to release the plug.

Although the provision of this thermal override proved to be worthwhile, it added to the design problems and cost of the nozzle due to the fact that three separate control members were required - one to permit release of the plug in response to first temperature, one to permit release of the plug in response to the existence of the above-mentioned predetermined pressure, and one to provide the thermal override.

SUMMARY OF THE INVENTION

It is, therefore, an object of the present invention to provide a discharge head of the above type which incorporates all the advantages of the heads discussed above, including the provision of a thermal override, yet which eliminates the design and cost problems normally associated with such heads.

It is a more specific object of the present invention to provide a discharge head of the above type, in which the pressure floor control and the thermal override control are incorporated in the same structural member.

Towards the fulfillment of these and other objects, the discharge head of the present invention comprises a body member adapted for connection to a source of extinguishant and normally maintained in a closed position in which extinguishant discharge therefrom is prevented, a first control member for conditioning said body member to open in response to the existence of a predetermined fire condition in the space to be protected by said head, and a second control member for permitting said body member to open in response to the conditioning thereof by said first control member and in response to the existence of a predetermined condition of said system, said second control member being adapted to permit said body member to open in response to another condition independent of the existence of said predetermined fire condition and the existence of said predetermined condition of said system.

DESCRIPTION OF THE PREFERRED EMBODIMENTS

Figure 1:
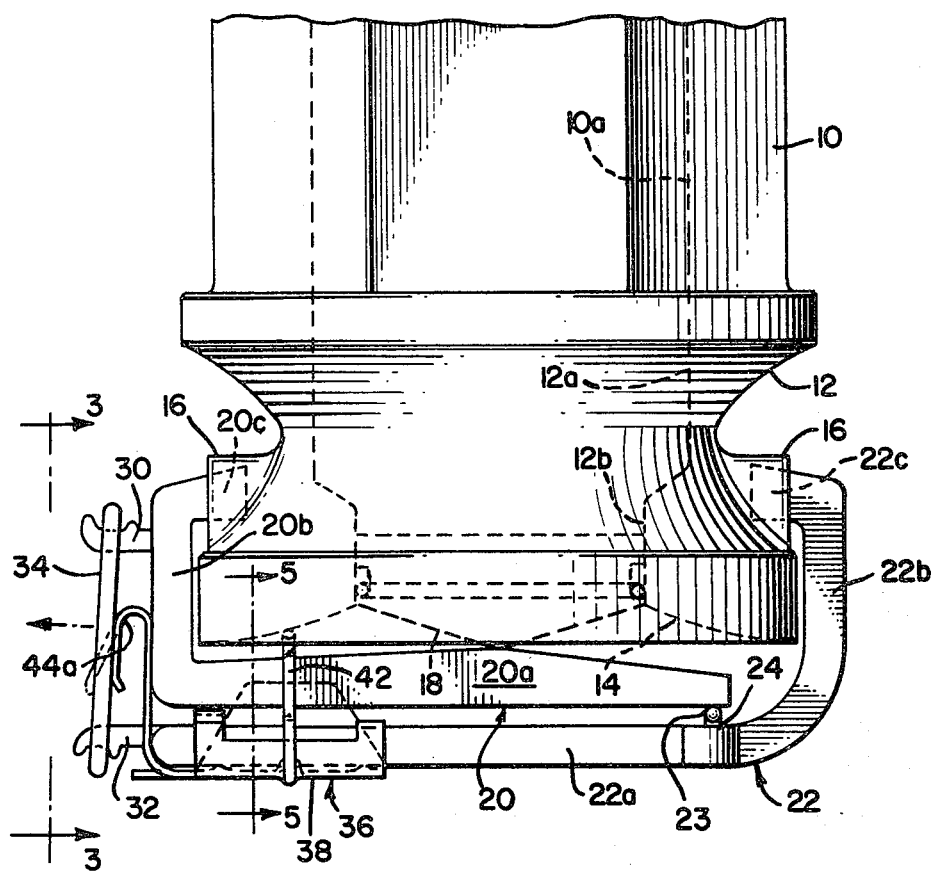
FIG. 1 is a front elevational view of the discharge head of the present invention shown in a fully assembled condition.
Figure 2:
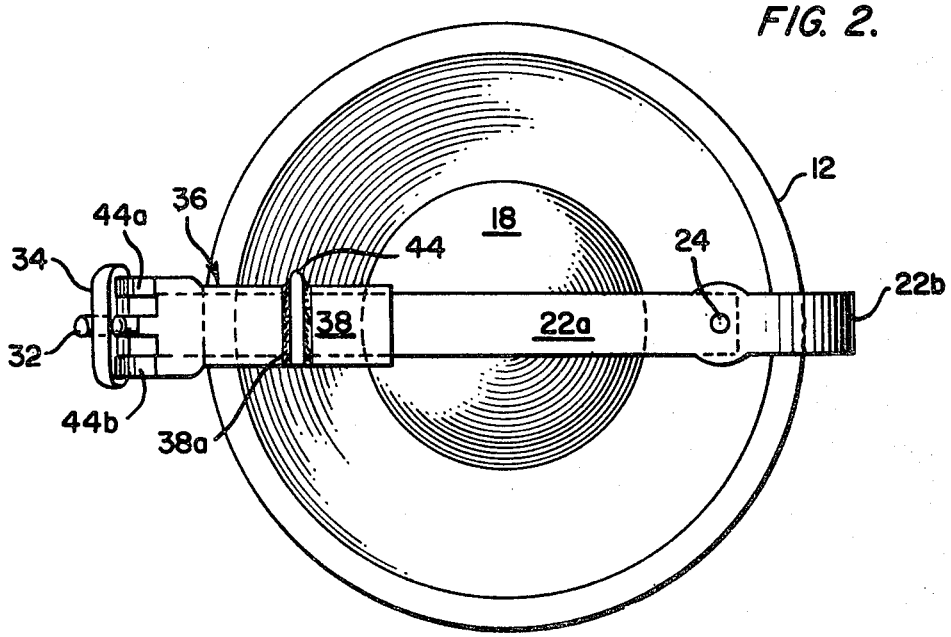
FIG. 2 is a bottom plan view of the discharge head of FIG. 1.
Figure 3:
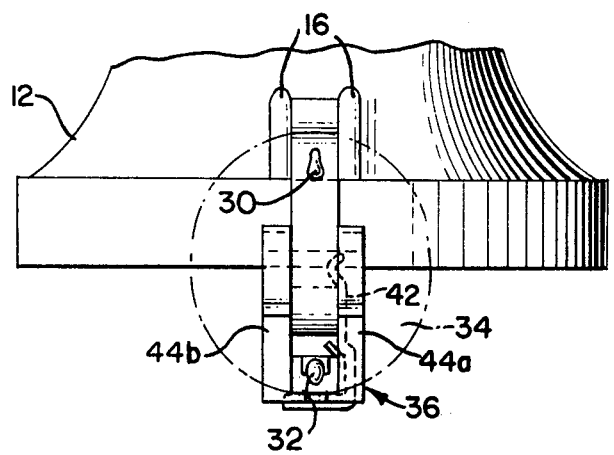
FIG. 3 is a cross-sectional view taken along the line 3—3 of FIG. 1.

Referring specifically to FIGS. 1-3 of the drawings, the discharge head of the present invention consists of a hollow cylindrical body member 10 having an extension 12 formed at one end thereof. The body member 10 has a centrally disposed through opening 10a which registers with a corresponding opening 12a formed in the extension 12. The opening 12a has a reduced throat portion 12b which flares outwardly at the end portion of the extension 12 to define an outlet 14. Although not shown in the drawings, it is understood that the other end portion of the body member 10 defines an internally threaded inlet portion for connection to a source of extinguishant, such as water, and that a swirl vane or the like is disposed within the body member for imparting a swirling action to the water as it passes therethrough in a conventional manner. As a result, water introduced into the inlet portion of the body member 10 is swirled as it passes through the body member with its flow being accelerated as it passes through the throat portion 12b before discharging in a substantially conical discharge pattern from the outlet 14.

Two pairs of shoulders 16 are disposed on the outer surface of the body member 10 at a section thereof having a reduced outer diameter, for reasons that will be described in detail later.

The outlet 14 is normally closed by means of a substantially conical-shaped plug member 18 which is normally retained therein by a pair of levers 20 and 22. One leg portion 20a of the lever 20 normally extends in a horizontal position, as viewed in FIG. 1, and has an inclined surface which engages the apex of the conical plug member 18. Also, the lever 20 has a vertical leg portion 20b which terminates in a horizontal shoulder portion 20c extending between one pair of shoulders 16 to locate the lever relative to the extension 12.

In a similar manner, the lever 22 has a horizontally extending leg portion 22a which is fulcrummed relative to the leg portion 20a of the lever 20 about a ball 23 resting on an adjustable pin 24 integral with the leg portion 22a and engaging the leg portion 20a. The lever 22 is also provided with a vertical leg portion 22b which terminates in a horizontal shoulder portion 22c extending between the other pair of shoulders 16.

A pair of tabs 30 and 32 are integral with, and extend from, the levers 20 and 22, respectively, and extend in a spaced parallel relation to the side of the extension 12. A fusible link 34, formed of a material that is adapted to fuse, or melt, at a predetermined elevated temperature, connects the tabs 30 and 32, and therefore maintains the levers 20 and 22 in their operative position retaining the plug 18 in the outlet 14.

Figure 4:
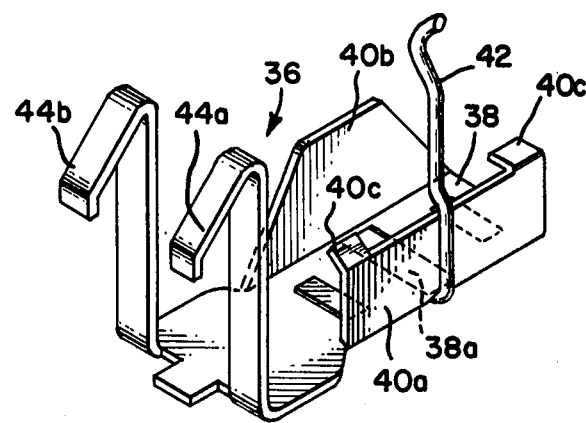
FIG. 4 is a perspective view of a separate component incorporated in the discharge head of FIG. 1.

As better shown in FIGS. 1 and 4, a saddle assembly 36 is supported by the lever 22 and has a substantially U-shaped cross-section defined by a floor 38 and two wall portions 40a and 40b sized to enclose the corresponding portions of the lever 22. The wall 40a is provided with a pair of tabs 40c that extend over the lever 22 to retain the saddle assembly 36 relative thereto.

Figure 5:
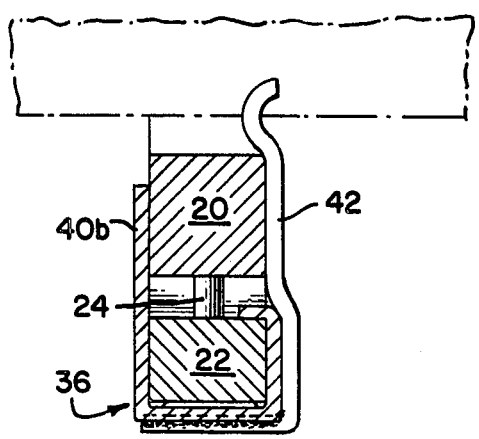
FIG. 5 is an enlarged cross-sectional view taken along the line 5—5 of FIG. 1.

A spring-loaded clip 42 is provided which also retains the levers 20 and 22 in their operative plug-retaining position. The clip 42 has one end portion soldered to the floor 38 of the saddle assembly 36, in a groove 38a formed therein, with another portion of the clip extending over and around portions of the levers 20 and 22, as better shown in FIG. 5. The other end portion of the clip 42 extends above the lever 20 and at an angle relative thereto. As a result, after melting of the link 34, the water pressure acting through the plug member 18 and the levers 20 and 22 establishes a vertical component of force which acts against the spring tension of the clip 42 and if sufficient, breaks the connection between the levers 20 and 22 provided by the clip.

The fusible connection provided between the clip 42 and the assembly 36 also enables a failsafe or redundant breaking of the connection between the levers 20 and 22 provided by the clip 42. In particular, the solder connecting the clip 42 to the floor 38 of the assembly 36 is selected to fuse, or melt, at a temperature greater than that at which the link 34 melts. As a result, the connection between the levers 20 and 22 will also be broken even though the water pressure in the head is not sufficient to break the connection, in the event the latter, greater temperature exists in the vicinity of the head.

According to another feature of the present invention, a pair of doubled-over leaf springs 44a and 44b extend from one end of the floor 38 and normally engage the fusible link 34 to urge same outwardly from the head. In this manner, upon the link 34 starting to melt in response to the occurrence of an elevated temperature in its vicinity, the leaf springs 44a and 44b will push same outwardly to break the connection between the levers 20 and 22. This will prevent a premature partial melting of the link 34 and a possible rehardening of same in the event the temperature should drop, which would change the thermal characteristics of the link and make its further operation unpredictable.

In operation, the discharge head of the present invention is assembled in its operative condition as shown in FIG. 1 with the levers 20 and 22 disposed in their operative position retaining the plug 18 in the outlet 14, and being maintained in this position by means of the link 34 and the clip 42.

Upon the occurrence of a predetermined elevated temperature in the vicinity of the link 34, the latter will start to melt and, after a predetermined melting occurs, will be forced outwardly from the vicinity of the head by the leaf springs 44a and 44b. After this occurs, if the water pressure existing in the body member 10 and the extension 12 is sufficient to force the clip 42 from its lever retaining position shown in FIG. 1, the levers 20 and 22 will fall from the latter position permitting the plug 18 to be released from the outlet 14 under the force provided by the pressure of the water.

In the event the latter pressure is insufficient to release the clip 42 after fusing of the link 34, the levers 20 and 22 will remain in their operative positions shown unless the temperature proximate to the head rises to the predetermined value which will cause the solder connecting the clip to the assembly 36 to melt. Upon the occurrence of this latter condition the clip 42 will release the levers 20 and 22, and thus permit the latter to fall from their operative position, and the plug 18 to be forced from the outlet 14 under the force of the water pressure.

It is thus seen that the arrangement of the present invention is relatively simple in design and inexpensive in cost, yet provides an effective, precise control of the operation of the head.

Several variations may be made in the foregoing without departing from the scope of the invention. For example, the extension portion 12 of the head may be provided with a continuous radial slot in order to discharge the extinguishant in an ancillary, substantially radial discharge pattern. Also the fusible link 34 may be replaced by a similar type member as long as the above described function of the link 34 is achieved.

Still other variations may be made in the discharge head of the present invention by those skilled in the art without departing from the invention as defined in the appended claims.

I claim:

1. A discharge head comprising a body member having an inlet adapted for connection to a source of fluid and an outlet for discharging said fluid, plug means; and support means for supporting said plug means relative to said body member in a position preventing the discharge of fluid from said outlet, said support means comprising a first lever disposed externally of said body member and in engagement with said plug means, a second lever connected to said body member and engaging said first lever, a fusible link connecting said levers and responsive to a predetermined temperature in the vicinity of said body member for releasing said connection, a spring loaded clip connecting said levers and responsive to a component of force of a predetermined value caused by a predetermined fluid pressure in said body member acting through said plug means and said levers, for releasing said latter connection, the releasing of said connections permitting said plug means to be forced from said discharge preventing position by said fluid, and said fluid to discharge from said outlet, and resilient means engaging said fusible link and adapted to urge same outwardly from said levers upon the fusing of said fusible link to facilitate said release.

2. The head of claim 1 further comprising additional thermal responsive means responsive to another predetermined temperature in the vicinity of said body member for permitting the release of said plug means from said discharge preventing position despite the absence of said predetermined fluid pressure.

3. The head of claim 2 wherein said other predetermined temperature is greater then said first predetermined temperature.

4. The head of claim 1 wherein said plug means is disposed in said outlet in said discharge preventing position.

5. The head of claim 1, wherein said clip is designed so that the force produced by said predetermined fluid pressure overcomes its spring tension to release said connection.

6. The head of claim 5 wherein said additional thermal responsive means comprises a meltable material connecting portions of said clip together, said meltable material adapted to melt at said other predetermined temperature to release the connection between said levers.

7. A discharge head assembly comprising a body member having an inlet adapted for connection to a source of fluid and an outlet for discharging said fluid, plug means adapted to attain an operative position relative to said body member for preventing the discharge of fluid from said outlet, a first lever member disposed externally of said body member and normally positioned in engagement with said plug means, a second lever member connected at one end portion to said housing and normally positioned in a fulcrumed engagement about said first lever member to urge said first lever member into its normal position, a fusible link connecting the other end portion of said second lever member to one of said other members to maintain said lever members in their normal position and said plug means in its operative position in the absence of a temperature in proximity to said fusible link above a predetermined value, a spring loaded clip connecting said second lever member to one of said other members to maintain said lever members in their normal positions and said plug means in its operative position in the absence of a component of force above a predetermined value caused by the fluid pressure in said body member acting through said plug means and said lever members, said plug means releasing from said operative position under the force of said fluid upon the release of said connections, and resilient means engaging said fusible link and adapted to urge same outwardly from said levers upon the fusing of said fusible link to facilitate said release.

8. The assembly of claim 7, wherein said resilient means is formed integral with said clip.

* * * * *